H. J. CRINER.
PISTON RING.
APPLICATION FILED JUNE 12, 1920.
1,381,544.
Patented June 14, 1921.
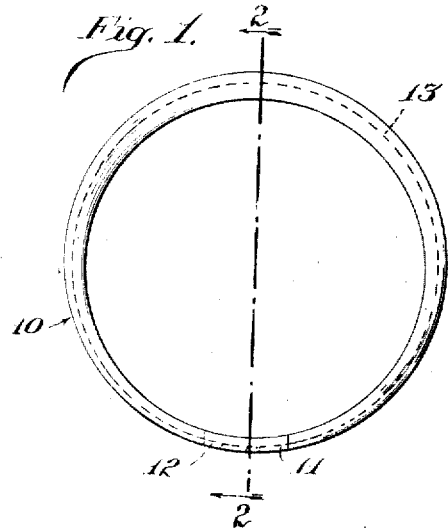
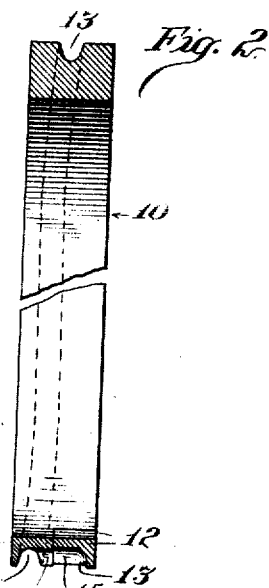
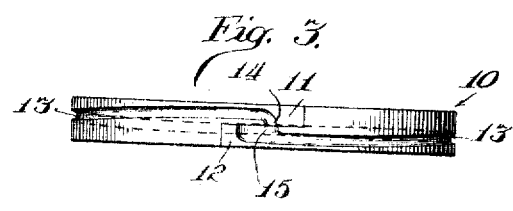
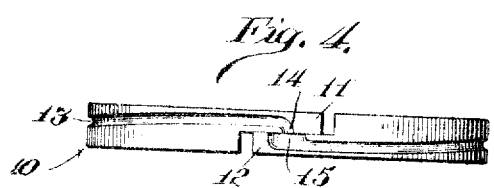
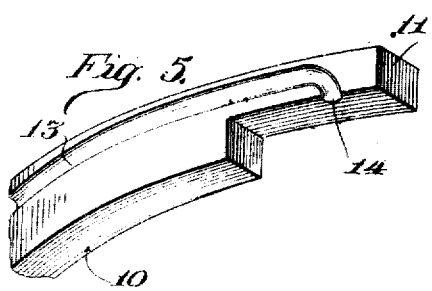
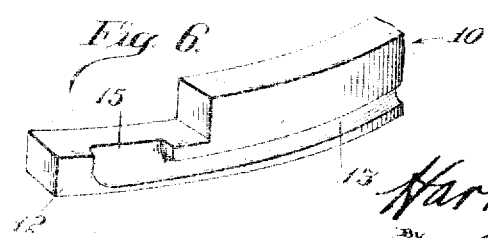

UNITED STATES PATENT OFFICE.

HARRY J. CRINER, OF MOLINE, ILLINOIS, ASSIGNOR OF ONE-HALF TO JAMES M. ROBINSON AND ONE-HALF TO JOHN W. BYBEE, BOTH OF MOLINE, ILLINOIS.

PISTON-RING.

1,381,544.   Specification of Letters Patent.   Patented June 14, 1921.

Application filed June 12, 1920. Serial No. 388,547.

*To all whom it may concern:*

Be it known that I, HARRY J. CRINER, a citizen of the United States, and a resident of Moline, in the county of Rock Island and State of Illinois, have invented certain new and useful Improvements in Piston-Rings, of which the following is a specification, reference being had to the accompanying drawings.

My invention relates to piston rings and particularly to the type of piston ring in ordinary use in internal combustion engines. As is well understood by those skilled in the art, the efficiency of an internal combustion engine depends very directly upon the continued proper fit of the piston within the cylinder. If the fit is poor, then the lubricating oil which must be splashed or otherwise supplied for lubricating the bearing parts of the piston within the cylinder is drawn into the cylinder and there results in a too heavy explosive mixture, as well as in an excessive deposit of carbon upon the walls of the cylinder. A poor fit of the piston results further in a failure to draw in a full charge of explosive mixture upon the suction stroke, to a higher degree even in a failure to obtain proper compression, and upon both the compression and the power strokes in a loss of power by the escape of gases past the piston. It is the object of my invention to provide a piston ring of a novel form which shall be effective and shall continue for a long time to remain effective for securing the desired close working fit between the piston and the cylinder so as to prevent leakage between the piston and the walls of the cylinder. The means by which I have accomplished my object is illustrated in the drawings and is hereinafter specifically described. That which I believe to be new and desire to secure by Letters Patent is set forth in the claims.

In the drawings,—

Figure 1 is a side view of a piston ring comprising my improved construction;

Fig. 2 is a cross section taken on a much enlarged scale at line 2—2 of Fig. 1, being partly broken away;

Fig. 3 is a bottom view of the ring as shown in Fig. 1;

Fig. 4 is a view similar to Fig. 3 but showing the ring in partially expanded condition;

Fig. 5 is an enlarged detail being a perspective view of the uppermost end portion of the split ring of Fig. 3 as seen from a point diagonally below and to the right of such portion; and Fig. 6 is an enlarged detail, being a perspective view of the lowermost portion of the the split-ring of Fig. 3 as seen from a point diagonally above and at the left.

Referring to the several figures of the drawings, in which corresponding parts are indicated by the same reference characters,— 10 indicates a piston ring which in the construction shown is of a form in which the ring is made heavier at one side than at the other. As is clearly shown in Fig. 3, the ring 10 comprises circumferentially-extending end portions 11 and 12 which are arranged side by side with their side edges in contact with each other. In the respects so far described, the ring is of the ordinary eccentric expansible lap-joint form.

For rendering my improved piston ring more effective than the ordinary ring for closing the space between the piston and the cylinder walls, I have provided in the outer face of my ring a continuous closed groove which extends completely about the ring. This groove comprises a circumferentially-extending groove portion 13 and cross groove portions 14 and 15 in the end portions 11 and 12 respectively of the ring. The cross groove portions 14 and 15 open at the sides of the end portions 11 and 12 respectively, the cross groove portion 15 being elongated circumferentially of the ring. The cross groove portions 14 and 15 are so positioned with respect to each other that when the ring is in its contracted condition as shown in Fig. 3, the cross groove portion 14 communicates with the elongated groove portion 15 near one end thereof. As will be readily understood, as the ring 10 is permitted to expand to and beyond the position shown in Fig. 4, the groove portion 14 travels along the elongated groove portion 15 so as to maintain communication therewith at all times. My structure accordingly insures at all times a continuous closed groove extending entirely about the ring.

As will be readily understood, as a piston equipped with one or more of my improved rings is moved in and out of its cylinder, oil will be picked up by the groove in the piston ring serving as a seal between the ring and the walls of the cylinder. By reason of having the groove in one end portion in communication with the groove in the other end portion of the split ring, the oil in the groove serves also to seal the joint of the ring and to seal between that portion of the ring and the wall of the cylinder. As the ring wears on its outer face and expands to maintain yielding contact with the walls of the cylinder, the ring of oil is maintained unbroken by reason of the elongation of one of the communicating openings as above described. By the provision of a ring of oil in this manner about the outer face of the piston ring, a very effective seal is provided increasing very materially the efficiency of the piston ring for closing the space between the piston and the cylinder wall, and by providing the continued communication as the rings expands the effectiveness of the ring is maintained for a long period until the ring is very materially worn.

What I claim as my invention and desire to secure by Letters Patent, is—

1. A piston ring comprising two circumferentially-extending portions arranged side by side, each of said portions being provided with a circumferentially-extending groove in its outer face, with the groove in each of said portions opening at the side of such portion and there communicating with the groove in the other portion.

2. A piston ring comprising two circumferentially-extending portions arranged side by side, each of said portions being provided with a circumferentially-extending groove in its outer face, with the groove in each of said portions opening at the side of such portion and there communicating with the groove in the other portion, the opening at the side of one of said ring portions being elongated circumferentially of the ring whereby the communication between said groove portions is maintained as said ring portions move longitudinally with respect to each other.

3. An expansible piston ring comprising circumferentially-extending end portions arranged side by side, said ring having a groove in its outer face extending completely thereabout with communication between the end portions of the groove effected by openings at the sides of the end portions of the ring.

4. An expansible piston ring comprising circumferentially-extending end portions arranged side by side, said ring having a groove in its outer face extending completely thereabout with communication between the end portions of the groove effected by openings at the sides of the end portions of the ring, one of said openings being elongated circumferentially and the openings being so positioned with respect to each other that the opening in one end portion is located near one end of the elongated opening in the other end portion when the ring is contracted and is located near the other end of said elongated opening when the ring is in its expanded condition.

5. An expansible piston ring provided with a groove in its outer face having its end portions in communication with each other when the ring is in expanded condition for forming a continuous closed groove completely about the ring.

6. An expansible piston ring having a groove in its outer face extending circumferentially from a point near one side at one end portion to a point near the other side at the other end portion, and having cross groove portions which communicate with each other and with the circumferentially-extending groove for completing a continuous closed groove entirely about the ring.

7. An expansible piston ring having a groove in its outer face extending circumferentially from a point near one side at one end portion to a point near the other side at the other end portion, and having cross groove portions which communicate with the circumferentially-extending groove and communicate with each other both with the ring in its contracted condition and with the ring in various degrees of expanded condition for completing at all times a continuous groove entirely about the ring.

HARRY J. CRINER.